L. L. SWENSON.
NUT LOCK.
APPLICATION FILED MAR. 17, 1910.
961,819.
Patented June 21, 1910.
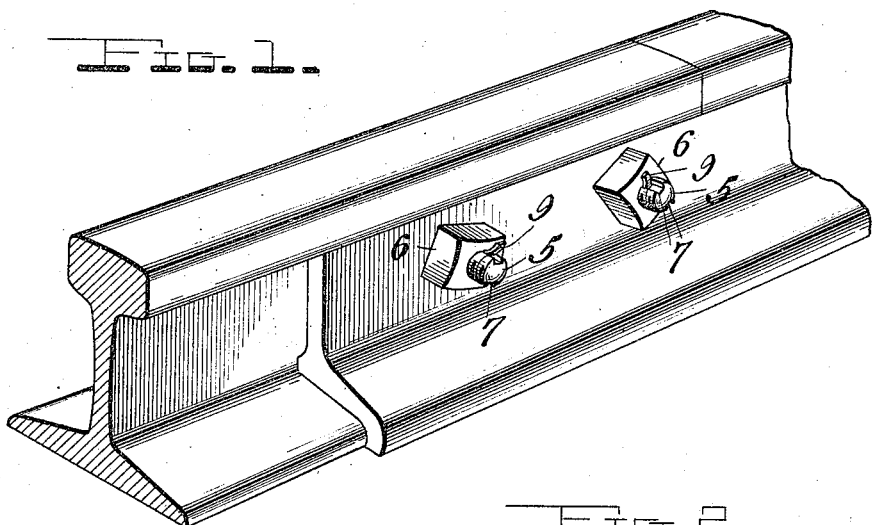
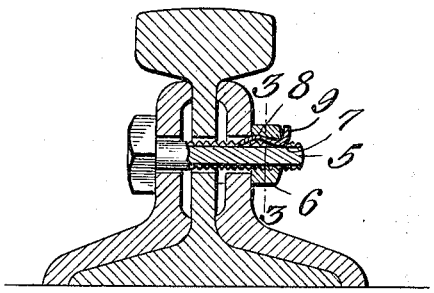
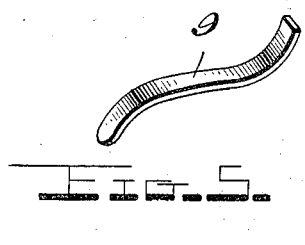
Witnesses
Chas. L. Griesbauer.
E. M. Ricketts
Inventor
L. L. Swenson,
By Watson E. Coleman.
Attorney

UNITED STATES PATENT OFFICE.

LUTHER L. SWENSON, OF OTTUMWA, IOWA.

NUT-LOCK.

961,819.
Specification of Letters Patent.
Patented June 21, 1910.

Application filed March 17, 1910. Serial No. 549,972.

*To all whom it may concern:*

Be it known that I, LUTHER L. SWENSON, a citizen of the United States, residing at Ottumwa, in the county of Wapello and State of Iowa, have invented certain new and useful Improvements in Nut-Locks, of which the following is a specification, reference being had to the accompanying drawings.

This invention relates to certain new and useful improvements in nut locks and has for its object to provide means for securely locking the nut upon the bolt and preventing the same from working off of the end of the bolt.

A further object of the invention is to improve the construction and greatly simplify devices of this character and also to produce a nut lock which may be manufactured at a very low cost and one which is efficient and highly durable in use.

With these and other objects in view, the invention consists of the novel construction, combination, and arrangement of parts, hereinafter fully described and claimed, and illustrated in the accompanying drawings, in which:—

Figure 1 is a perspective view illustrating one application of my invention showing the same applied to a rail joint; Fig. 2 is a vertical longitudinal section through a bolt having a nut lock thereon; Fig. 3 is a section taken on the line 3—3 of Fig. 2; Fig. 4 is a detail perspective view of the bolt; and Fig. 5 is a detail perspective view of the locking spring.

Referring more particularly to the drawings, 5 indicates a bolt provided with the usual threads to receive a nut 6. This bolt is provided upon opposite sides with shallow longitudinal grooves 7. These grooves would preferably be cut the depth of the bolt threads and extend from the outer end of the bolt to the head thereof. The bore of the nut 6 is of course likewise threaded for engagement with the threads on the bolt and a longitudinally extending recess 8, is formed therein and communicates with the bore. This recess gradually increases in depth from its outer to its inner end as clearly shown in Fig. 2 of the drawings and is adapted to receive a locking spring 9. This spring is in the form of a strip of resilient metal bent to describe a compound curve. The inner curved end of the spring is positioned in the deepest portion of the recess 8, of the nut and the tension of said spring will obviate the possibility of its accidental outward movement owing to the gradually decreasing space between the base of the longitudinally extending groove 7 and the base of the recess 8. The positioning of this spring in the groove of the bolt will prevent any turning movement of the nut thereon and when in position the outer protruding end of the spring may be bent upwardly upon the face of the nut whereby a secure and efficient lock is provided without detracting from the appearance of the device or the object in which the bolt is positioned. By providing a groove in each side of the bolt, the nut may be securely locked by a half turn thereon so that it may be brought into secure clamping engagement with the face of the fish plate of the rail or other object.

From the above it will be seen that I have provided a very efficient nut lock which is of such construction that it will permit of the removal of the nut from the bolt without destroying the same, the locking spring being capable of ready withdrawal from the groove of the bolt. The nut may be very quickly locked upon the bolt without necessitating the use of tools as the spring is easily inserted into the groove of the bolt between the same and the recess in the nut. It will be obvious, that if desired, the spring instead of being in the form of a flat strip may be constructed of resilient wire of a good quality of steel, and that by the employment of this locking spring, the expense of production is reduced to a minimum, the spring being capable of manufacture in large numbers at a very slight expense. The grooves and recesses in the bolts and nuts may be provided as they are manufactured with very little additional expense. The nut lock is also very strong and durable and is applicable to a great many purposes other than that disclosed in the drawings.

It will be understood that the device may be variously modified so as to render the same applicable to other uses without materially departing from the essential features or sacrificing any of the advantages of the invention.

What is claimed is:

1. A nut lock comprising a threaded bolt having a nut engaged thereon, said bolt being provided with opposite longitudinally extending grooves in its periphery, said nut having a longitudinal recess therein gradually increasing in depth from its outer to its inner end and adapted to be disposed in alinement with one of the grooves of the bolt, and a locking spring formed from a strip of resilient sheet metal, said sheet metal strip being bent in the form of a compound curve between its ends, one end of said spring being engaged with the base of the groove in the bolt inwardly of the nut, one of the curves of said spring bearing upon the base of the recess in the nut, said spring adjacent to its outer end again engaging in the groove of the bolt thereby having two separate points of contact with the base of said groove, the gradually increasing depth of the recess in the nut which is engaged by said spring preventing the accidental outward movement of the spring, the outer end of said spring being bent upon the face of the nut.

2. A nut lock comprising a threaded bolt having a nut engaged thereon, said bolt being provided with opposite longitudinally extending grooves in its periphery of substantially the same depth as the threads thereon, said nut having a longitudinal recess therein gradually increasing in depth from its outer to its inner end and adapted to be disposed in alinement with one of the grooves of the bolt, a locking spring insertible into the groove and recess of the bolt and nut and yieldingly engaging with the walls thereof to hold the nut against rotation, said spring being bent to form a compound curve, the gradually increasing depth of the recess in the nut preventing the outward movement of the spring, said spring having its outer end bent upon the face of the nut.

In testimony whereof I hereunto affix my signature in the presence of two witnesses.

LUTHER L. SWENSON.

Witnesses:
 AXEL ELMBORG,
 JAMES GEE.